US010608735B2

(12) United States Patent
Cress et al.

(10) Patent No.: US 10,608,735 B2
(45) Date of Patent: Mar. 31, 2020

(54) SYSTEMS AND METHODS FOR PERFORMING OPTICAL LINE TERMINAL (OLT) FAILOVER SWITCHES IN OPTICAL NETWORKS

(71) Applicant: ADTRAN, Inc., Huntsville, AL (US)

(72) Inventors: Jared D. Cress, Decatur, AL (US);
Charles E. Polk, Jr., Athens, AL (US);
Nagaraj Padur, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 28 days.

(21) Appl. No.: 15/587,146

(22) Filed: May 4, 2017

(65) Prior Publication Data

US 2017/0324471 A1    Nov. 9, 2017

Related U.S. Application Data

(60) Provisional application No. 62/331,852, filed on May 4, 2016.

(51) Int. Cl.
*H04Q 11/00*    (2006.01)
*H04B 10/03*    (2013.01)
(Continued)

(52) U.S. Cl.
CPC .......... *H04B 10/03* (2013.01); *H04B 10/032* (2013.01); *H04J 14/08* (2013.01); *H04Q 11/0005* (2013.01); *H04Q 11/0062* (2013.01); *H04Q 11/0067* (2013.01); *H04Q 11/00* (2013.01); *H04Q 2011/0018* (2013.01); *H04Q 2011/0033* (2013.01); *H04Q 2011/0043* (2013.01);
(Continued)

(58) Field of Classification Search
CPC .. H04B 10/03; H04B 10/032; H04Q 11/0067; H04Q 11/0062; H04Q 11/0005; H04Q 2011/0081; H04Q 2011/0043; H04Q 2011/0018; H04Q 2011/0086; H04Q 2011/0033; H04Q 11/00; H04J 14/08
USPC ............................................ 398/1–8, 43–103
See application file for complete search history.

(56) References Cited

U.S. PATENT DOCUMENTS

6,108,112 A    8/2000  Touma
6,411,410 B1   6/2002  Wright et al.
(Continued)

*Primary Examiner* — Dibson J Sanchez
(74) *Attorney, Agent, or Firm* — Maynard Cooper & Gale, P.C.; Jon E. Holland (57) ABSTRACT

A system for performing failover switches in an optical network, such as a time and wavelength division passive optical networks (TWDM PON) like NG-PON2, includes a backup optical line terminal (OLT) for backing up communications of a primary OLT. The backup OLT is configured to allocate small upstream time slots, referred to herein as "de minimis" time slots, to at least one optical network terminal (ONT) communicating with the primary OLT during normal operation. When a failure occurs that prevents communication between the ONT and the primary OLT, the ONT autonomously tunes to the upstream and downstream wavelength pairs of the backup OLT and begins to transmit data to the backup OLT in the de minimis time slot allocated to it. The presence of data in the de minimis time slot indicates the occurrence of a failover switch to the backup OLT, and the backup OLT then begins to allocate time slots to this ONT, which is normally serviced by the primary OLT according to its normal TDM algorithm.

17 Claims, 3 Drawing Sheets

(51) Int. Cl.
  *H04B 10/032* (2013.01)
  *H04J 14/08* (2006.01)
(52) U.S. Cl.
  CPC .............. *H04Q 2011/0081* (2013.01); *H04Q 2011/0086* (2013.01)

(56) References Cited

U.S. PATENT DOCUMENTS

| | | | | |
|---|---|---|---|---|
| 6,975,586 | B1* | 12/2005 | Yoshimura | H04B 10/032 370/217 |
| 8,818,201 | B2* | 8/2014 | Healey | H04B 10/032 398/1 |
| 9,106,332 | B2* | 8/2015 | Zheng | H04J 3/0641 |
| 9,319,758 | B2* | 4/2016 | Goswami | H04B 10/032 |
| 9,479,284 | B2* | 10/2016 | Kaneko | H04B 10/272 |
| 9,749,052 | B2* | 8/2017 | Xu | H04J 3/14 |
| 2002/0021472 | A1* | 2/2002 | Nakaishi | H04J 14/0282 398/168 |
| 2002/0030865 | A1* | 3/2002 | Kawate | H04Q 11/0062 398/33 |
| 2002/0105691 | A1* | 8/2002 | Ichibangase | H04B 10/272 398/2 |
| 2002/0114028 | A1* | 8/2002 | Eijk | H04B 10/077 398/2 |
| 2005/0089027 | A1 | 4/2005 | Colton | |
| 2007/0064731 | A1* | 3/2007 | Mizutani | H04L 47/10 370/468 |
| 2007/0268818 | A1* | 11/2007 | Sugihara | H04J 3/14 370/216 |
| 2008/0013950 | A1 | 1/2008 | Boudreault et al. | |
| 2008/0131124 | A1* | 6/2008 | Nam | H04B 10/032 398/67 |
| 2008/0152340 | A1 | 6/2008 | Hung et al. | |
| 2008/0267628 | A1* | 10/2008 | Li | H04J 14/0226 398/79 |
| 2009/0080889 | A1 | 3/2009 | Nozue et al. | |
| 2009/0214222 | A1* | 8/2009 | Grossman | H04B 10/032 398/173 |
| 2009/0245792 | A1* | 10/2009 | Oishi | H04Q 11/0067 398/66 |
| 2009/0269053 | A1* | 10/2009 | Yang | H04B 10/0791 398/22 |
| 2010/0054739 | A1* | 3/2010 | Lavillonniere | H04J 3/0682 398/67 |
| 2010/0098407 | A1* | 4/2010 | Goswami | H04B 10/032 398/5 |
| 2010/0166419 | A1 | 7/2010 | Elmoalem et al. | |
| 2010/0183300 | A1* | 7/2010 | Yokotani | H04L 12/413 398/41 |
| 2011/0013903 | A1* | 1/2011 | Rafel Porti | H04J 3/14 398/1 |
| 2011/0044683 | A1* | 2/2011 | Trojer | H04B 10/272 398/1 |
| 2011/0158638 | A1* | 6/2011 | Mie | H04L 12/413 398/16 |
| 2011/0188849 | A1* | 8/2011 | Haramaty | H04B 17/00 398/25 |
| 2011/0280568 | A1* | 11/2011 | Dvir | H04B 10/0771 398/13 |
| 2011/0293265 | A1* | 12/2011 | Grobe | H04J 14/0282 398/16 |
| 2011/0317998 | A1* | 12/2011 | Fujimura | H04J 3/0682 398/25 |
| 2012/0070147 | A1* | 3/2012 | Mizutani | H04L 43/0852 398/25 |
| 2012/0082449 | A1* | 4/2012 | Zheng | H04J 3/0682 398/25 |
| 2012/0093500 | A1* | 4/2012 | Shiba | H04J 14/0246 398/25 |
| 2012/0134664 | A1* | 5/2012 | Zheng | H04L 45/22 398/5 |
| 2012/0195589 | A1* | 8/2012 | Nors | H04L 45/22 398/5 |
| 2012/0237213 | A1* | 9/2012 | Yin | H04L 43/50 398/28 |
| 2012/0315040 | A1* | 12/2012 | Dahlfort | H04J 14/0246 398/58 |
| 2013/0045010 | A1* | 2/2013 | Mukai | H04B 10/07 398/52 |
| 2013/0089316 | A1* | 4/2013 | Trojer | H04Q 11/0067 398/2 |
| 2013/0148956 | A1* | 6/2013 | Khotimsky | H04B 10/032 398/2 |
| 2013/0195439 | A1* | 8/2013 | Mangin | H04B 10/27 398/2 |
| 2013/0266306 | A1* | 10/2013 | Kozaki | H04J 3/0655 398/5 |
| 2013/0315587 | A1* | 11/2013 | Mukai | H04L 12/40039 398/45 |
| 2014/0093232 | A1 | 4/2014 | Hood | |
| 2014/0099097 | A1* | 4/2014 | Zheng | H04L 41/0663 398/5 |
| 2014/0161436 | A1* | 6/2014 | Lee | H04B 10/03 398/1 |
| 2014/0161461 | A1* | 6/2014 | Lee | H04J 3/0682 398/79 |
| 2014/0226966 | A1 | 8/2014 | Lutgen | |
| 2014/0270770 | A1* | 9/2014 | Lutgen | H04J 14/0221 398/66 |
| 2014/0294388 | A1* | 10/2014 | Odaka | H04B 10/27 398/66 |
| 2014/0321845 | A1* | 10/2014 | Jiang | H04Q 11/0067 398/5 |
| 2014/0341561 | A1* | 11/2014 | Effenberger | H04B 10/032 398/5 |
| 2015/0037035 | A1* | 2/2015 | Sugawa | H04J 14/08 398/66 |
| 2015/0063811 | A1* | 3/2015 | Furusawa | H04L 47/6295 398/66 |
| 2015/0125153 | A1* | 5/2015 | Lee | H04B 10/0793 398/79 |
| 2015/0207585 | A1* | 7/2015 | Luo | H04J 14/0256 398/72 |
| 2015/0229430 | A1* | 8/2015 | Liang | H04J 14/0242 298/68 |
| 2015/0244454 | A1* | 8/2015 | Kim | H04B 10/032 398/2 |
| 2015/0288444 | A1* | 10/2015 | Pu | H04L 41/0663 398/5 |
| 2015/0326337 | A1* | 11/2015 | Yoshida | H04L 12/44 398/48 |
| 2015/0365192 | A1* | 12/2015 | Kim | H04J 14/0256 398/66 |
| 2016/0073180 | A1* | 3/2016 | Khotimsky | H04Q 11/0067 398/34 |
| 2016/0094469 | A1* | 3/2016 | Furusawa | H04L 47/54 398/47 |
| 2016/0234582 | A1* | 8/2016 | Ronald | H04Q 11/0067 |
| 2016/0248539 | A1* | 8/2016 | Kaneko | H04J 14/0282 14/282 |
| 2016/0269105 | A1* | 9/2016 | Yoshida | H04B 10/032 |
| 2016/0344472 | A1* | 11/2016 | Geng | H04B 10/032 |
| 2017/0170923 | A1* | 6/2017 | Yoshida | H04B 10/272 |
| 2017/0171647 | A1* | 6/2017 | Gao | H04B 10/25 |
| 2017/0207875 | A1* | 7/2017 | Yoshida | H04J 14/025 |
| 2017/0237518 | A1* | 8/2017 | Yang | H04J 14/0282 398/79 |
| 2017/0303020 | A1* | 10/2017 | Ye | H04J 14/02 |
| 2018/0131462 | A1* | 5/2018 | Yoshida | H04L 12/44 |
| 2018/0145788 | A1* | 5/2018 | Yoshida | H04L 12/44 |

* cited by examiner

SYSTEMS AND METHODS FOR PERFORMING OPTICAL LINE TERMINAL (OLT) FAILOVER SWITCHES IN OPTICAL NETWORKS

CROSS REFERENCE TO RELATED APPLICATION

This application claims priority to U.S. Provisional Patent Application No. 62/331,852, entitled "NGPON2 Fast Failover Support" and filed on May 4, 2016, which is incorporated herein by reference.

RELATED ART

In optical networks, an optical line terminal (OLT) is often used to communicate with a plurality of optical network terminals (ONTs) across an optical network, such as a passive optical network (PON). In some cases, to increase network bandwidth, multiple OLTs may be connected to a shared fiber, and wavelength-division multiplexing may be used to separate the optical signal pairs (upstream and downstream) communicated by the different OLTs. In some architectures such as NG-PON2, the ONTs employ tunable optics so that they can select between a multiplicity of wavelength pairs on the fiber, allowing for mobility between OLTs. In such embodiments, the OLTs may also be configured to provide failover support such that the traffic communicated by one OLT (referred to in this context as a "primary" OLT) may be switched to another OLT (referred to in this context as a "backup" OLT) in the event of a failure associated with the primary OLT. Thus, ONTs serviced by the primary OLT may begin receiving service from the backup OLT when a failure occurs that prevents communication with the primary OLT.

In a typical PON, the upstream communication is often time-division multiplexed, and the OLT controlling the PON often uses a control channel to allocate time slots to the ONTs according to a time-division multiplexing (TDM) algorithm so that at any given time only one ONT on the PON is permitted to transmit upstream through the shared fiber, thereby avoiding data collisions. To effectuate a failover switch from a primary OLT to a backup OLT, the backup OLT should be informed of the failover switch so that it can begin providing services to the ONTs previously serviced by the primary OLT. Once the backup OLT becomes aware of the failover switch, it may begin allocating time slots to the ONTs associated with the failover switch so that they may begin communicating with the backup OLT instead of the primary OLT.

During normal PON operations, an ONT associates with an OLT through an activation process. In this regard, in allocating upstream time slots, OLTs are typically configured to define quiet periods, referred to herein as "registration periods," for permitting unregistered ONTs to join the PON. During such registration period, the ONTs currently registered with the OLT are prevented from communicating upstream, and any unregistered ONT may communicate upstream in order to register with the OLT, which assigns a network identifier to the ONT and performs other actions for enabling the ONT to communicate with the OLT across the PON. After registration, the OLT is aware of the ONT's presence on the PON and begins to allocate time slots to the ONT.

During a failover switch, the ONTs previously communicating with the primary OLT may tune to the upstream wavelength of the backup OLT and register or otherwise communicate with the backup OLT during a registration period, thereby indicating the failover switch to the backup OLT. However, performing a failover switch in this manner may take a relatively long time, such as 20 seconds or more, since the ONTs must wait on the occurrence of a registration period before initiating communication with the backup OLT after communication failure with the primary OLT. In many cases, this delay exceeds the minimum delays specified by service level agreements (SLAs), which may require interruptions of traffic of less than about 50 milliseconds (ms) or so.

In an effort to address such shortcomings, attempts have been made to inform the backup OLT of a failover switch quicker using communication between the OLTs. In this regard, the primary OLT may be connected to the backup OLT to provide a control channel between the OLTs such that the primary OLT may inform the backup OLT of a failover switch without waiting for a registration period. As an example, if the laser of the primary OLT fails, the primary OLT may provide a notification to the backup OLT, which may then begin allocating time slots to the ONTs previously communicating with the primary OLT. Such techniques may help to reduce the delay associated with a failover switch, but the primary OLT may be unable to provide notification to the backup OLT in all cases. As an example, for some failures, such as loss of power at the primary OLT, the primary OLT may be unable to communicate with the backup OLT. In such case, it is possible for the ONTs to communicate with the backup OLT during a registration period, as described above, but it may take considerably longer for the backup OLT to learn of the failover switch in such a situation.

To provide fast notification of a failover switch when a failure at the primary OLT prevents it from communicating with other OLTs, it is also possible for the primary OLT and backup OLT to periodically communicate heartbeat messages to one another during normal operation. If the backup OLT stops receiving heartbeat messages from the primary OLT for at least a specified time period, the backup OLT may assume that the primary OLT has failed and begin allocating time slots to the ONTs previously communicating with the primary OLT. Such a technique may permit the backup OLT to initiate a fast failover switch in the event that a failure prevents communication between the primary OLT and the backup OLT. However, there are some scenarios where an OLT may be unable to detect a sub-system failure and continue to communicate heartbeats despite the fact that traffic has been interrupted.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for performing failover switches in optical networks. In some embodiments, a backup optical line terminal (OLT) for backing up communications of a primary OLT is configured to allocate small upstream time slots, referred to herein as "de minimis" time slots, to at least one optical network terminal (ONT) communicating with the primary OLT during normal operation. When a failure occurs that prevents communication between the ONT and the primary OLT, the ONT autonomously tunes to the upstream and downstream wavelength pairs of the backup OLT and begins to transmit data to the backup OLT in the de minimis time slot allocated to it. The presence of data in the de minimis time slot indicates the occurrence of a failover switch to the backup OLT, and the backup OLT then begins to allocate time slots to this ONT, which is normally serviced by the primary OLT, according to its normal time-division multiplexed (TDM) algorithm.

Figure 1:
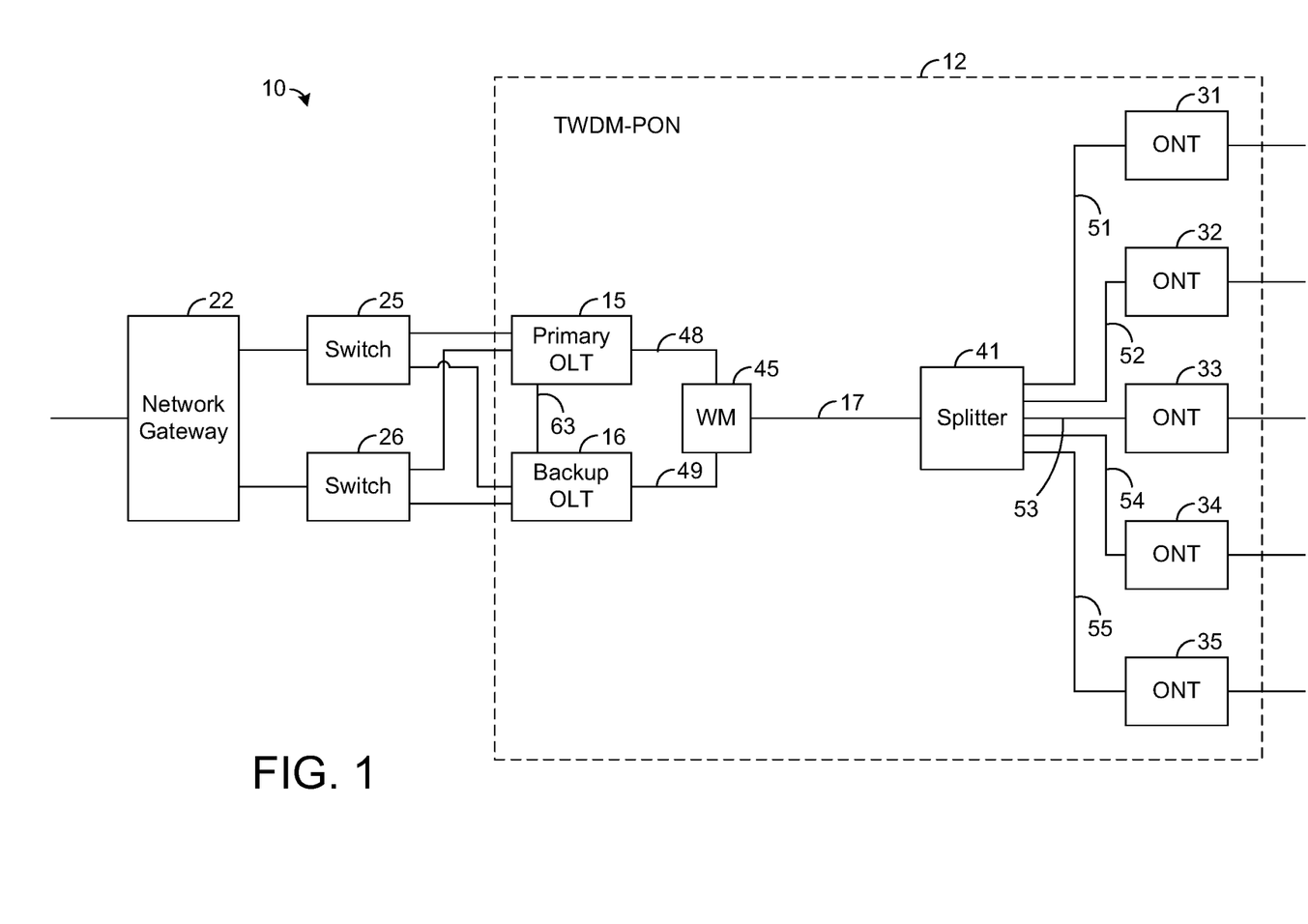
FIG. 1 is a block diagram illustrating an exemplary embodiment of a communication system having a time and wavelength-division multiplexed passive optical network (TWDM-PON).

FIG. 1 depicts an exemplary embodiment of a communication system 10 having an optical network 12 for communicating data. In the embodiment shown by FIG. 1, the optical network 12 is a time and wavelength-division multiplexed passive optical network (TWDM-PON), but other types of optical networks are possible in other embodiments. The TWDM-PON 12 has a plurality of OLTs 15, 16 that communicate through at least one optical fiber 17 shared by the OLTs 15, 16, as will be described in more detail below.

In the downstream direction, a network gateway 22 may receive data to be transmitted across the TWDM-PON 12, such as data packets in accordance with one or more known communication protocols. As an example, the gateway 22 may receive data packets from a telecommunication network (not specifically shown), such as the Internet, or other network or combinations of networks. The gateway 22 transmits the data through a plurality of switches 25, 26 to the OLTs 15, 16, respectively, as shown by FIG. 1.

Each OLT 15, 16 is configured to receive from its respective switch 25, 26 an electrical signal defining downstream data and to convert the signal from the electrical domain to the optical domain for communication through the TWDM-PON 12. In this regard, each OLT 15, 16 is configured to encapsulate the data in accordance with a known optical protocol, such as NG-PON2, and to communicate the data via an optical signal through the optical fiber 17 to a plurality of ONTs 31-35. In this regard, the optical fiber 17 is coupled to at least one optical splitter 41 that is configured to split each downstream optical signal into multiple components that are respectively transmitted to the ONTs 31-35 through optical fibers 51-55.

When an ONT 31-35 receives a downstream optical signal, the ONT is configured to convert the signal from the optical domain to the electrical domain. The ONT 31-35 may de-encapsulate the data to strip the overhead of the optical protocol of the TWDM-PON 12 before transmitting the data further downstream, such as to one or more customer premises transceivers (not specifically shown) at one or more customer premises.

Each OLT 15, 16 transmits a downstream optical signal at a different wavelength relative to the wavelengths for the downstream optical signals transmitted by the other OLTs of the TWDM-PON 12 in order to prevent data collisions. As shown by FIG. 1, each OLT 15, 16 and the optical fiber 17 are coupled to a wavelength multiplexer (MUX) 45 by a respective optical fiber 48, 49. The wavelength MUX 45 may combine downstream optical signals from multiple OLTs 15, 16 for transmission through the optical fiber 17. For simplicity of illustration, FIG. 1 shows two OLTs 15, 16, one wavelength MUX 45, one optical splitter 41, and five ONTs 31-35, but the TWDM-PON 12 may have any number of OLTs 15, 16, wavelength MUXs 41, optical splitters 41, and ONTs 31-35 in other embodiments.

In the upstream direction, each ONT 31-35 receives an electrical signal carrying data to be communicated through the TWDM-PON 12 and converts the signal from the electrical domain to the optical domain. In this regard, the ONT is configured to encapsulate the data in accordance with a known optical protocol, such as NG-PON2, and to communicate the data via an optical signal through the optical fiber 17 to the OLT 15, 16 that is servicing the ONT. Each ONT that is communicating with the same OLT is configured to transmit upstream at the same wavelength. Thus, each OLT 15, 16 is associated with a wavelength pair: one wavelength for downstream communication and another wavelength for upstream communication. The upstream communications for the same OLT 15, 16 are time-division multiplexed (TDM) under the control of the OLT according to a desired TDM algorithm in order to prevent data collisions.

In this regard, as described above, each ONT 31-35 is assigned to a particular OLT 15, 16, which communicates with the ONT via a control channel in order to allocate time slots to the ONT. During each time slot allocated to the ONT, the ONT is permitted to transmit upstream, and the ONT is not permitted to transmit upstream during other time slots. Further, each time slot allocated by the same OLT preferably does not overlap with other time slots allocated by the OLT such that upstream data collisions are prevented.

For illustrative purposes, it will be assumed hereafter unless otherwise indicated that ONTs 31-33 are assigned to and, thus, in communication with the OLT 15 and ONTs 34, 35 are assigned to and in communication with the OLT 16. However, in the event of a failure that prevents communication between the OLT 15 and the ONTs 31-33, assume that the system 10 is configured such that a failover switch occurs causing the ONTs 31-33 to begin communicating with OLT 16. Thus, in the context of this example, the OLT 15 will be referred to herein as the "primary" OLT 15 of ONTs 31-33, and the OLT 16 will be referred to herein as the "backup" OLT of ONTs 31-33.

In addition, for illustrative purposes, the configuration and operation of the ONT 31 will be described in more detail hereafter in the context of a failover switch for switching communication from the primary OLT 15 to the backup OLT 16. It is to be understood that the ONTs 32, 33 may be similarly configured and operated such that communication transitions from the primary OLT 15 to the backup OLT 16 in a similar manner as described below for ONT 31.

In one exemplary embodiment, the ONT 31 is configured to register with the primary OLT 15, which is configured to communicate with the backup OLT 16 via a communication connection 63 or otherwise thereby enabling the primary OLT 15 to share information about the ONT 31. As an example, the primary OLT 15 may share the ONT's network identifier and other information for enabling the backup OLT 16 to communicate with the ONT 31 in the event of a failure associated with the primary OLT 15. In addition, the ONT 31 is commanded to range with both the primary OLT 15 and the backup OLT 16 to determine the appropriate delay offsets and other information required by each OLT to effect successful communication.

Figure 2:
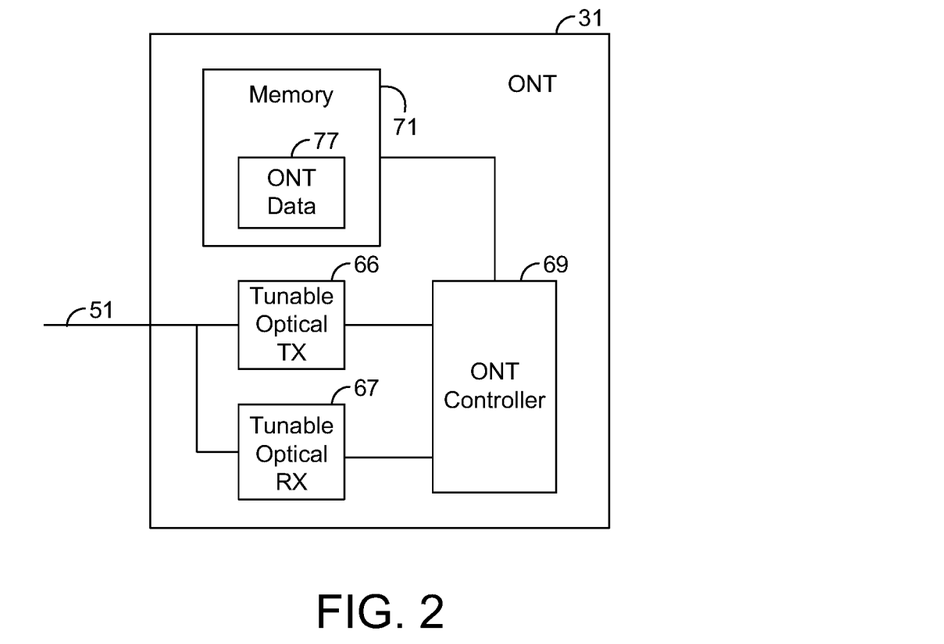
FIG. 2 is a block diagram illustrating an exemplary embodiment of an optical network terminal (ONT), such as is depicted by FIG. 1.

In this regard, FIG. 2 depicts an exemplary embodiment of an ONT 31. As shown by FIG. 2, the ONT 31 has a tunable optical transmitter (TX) 66 and a tunable optical receiver (RX) 67 that are optically coupled to the optical fiber 51. The tunable optical transmitter 66 has at least one optical component, such as a laser, for transmitting an optical signal through the fiber 51 to an OLT (not shown in FIG. 2). The tunable optical transmitter 66 also has circuitry for controlling the laser, such as its transmission power and wavelength. As an example, the circuitry of the tunable optical transmitter 66 may tune the laser to output an optical signal at a desired wavelength, such as the wavelength associated with upstream communications for the primary OLT 15 (FIG. 1). When a failover switch occurs, as will be described in more detail below, the circuitry of the tunable optical transmitter 66 under the direction and control of a controller 69 may tune the laser to output an optical signal at the wavelength associated with upstream communications for the backup OLT 16.

The tunable optical receiver 67 has at least one optical component, such as an avalanche photodiode (APD), for receiving an optical signal from the fiber 51. The tunable optical receiver 67 also has circuitry for controlling the wavelength reaching the APD. As an example, the circuitry of the tunable optical receiver 67 may tune to receive an optical signal at the wavelength associated with downstream communications for the primary OLT 15. When a failover switch occurs, as will be described in more detail below, the circuitry of the tunable optical receiver 67 under the direction and control of a controller 69 may tune to receive an optical signal at the wavelength associated with downstream communications for the backup OLT 16.

Note that connection 63 may be a physical connection, such as conductive wires or an optical fiber, or a wireless connection 63. Further, use of a separate physical or wireless connection 63 is unnecessary. As an example, the information communicated between OLTs 15, 16 may be embedded in a control channel communicated through the switches 25, 26 using the same or different physical connections that are used to communicate data carried by the TWDM-PON 12. Yet other configurations and techniques for enabling communication between the OLTs 15, 16 are possible.

As shown by FIG. 2, the ONT 31 has a controller 69, referred to herein as "ONT controller," and memory 71. The ONT controller 69 can be implemented in hardware or a combination of hardware in conjunction with software or firmware. As an example, the controller 69 may include one or more application specific integrated circuits (ASICs), field-programmable gate arrays (FPGAs), processors (e.g., microprocessors) programmed with software or firmware, and/or other types of circuitry for performing the functionality or tasks described herein for the controller 69.

In this regard, the ONT controller 69 is configured to perform and control various operations, as will be described in more detail herein. As an example, in the upstream direction, the ONT controller 69 may be configured to receive a stream of data, encapsulate the stream in accordance with an optical protocol of the TWDM-PON 12, such as NG-PON2, and provide the data stream to the tunable optical transmitter 66 for transmission to an OLT. In the downstream direction, the ONT controller 69 may be configured to receive a stream of data from the tunable optical receiver 67, de-encapsulate the data to strip away overhead associated with the optical protocol of the TWDM-PON 12, and transmit the data further downstream (e.g., toward customer premises equipment at one or more customer premises). The ONT controller 69 may also control the timing of transmissions by the tunable optical transmitter 66 based on control data embedded in the optical protocol so that the tunable optical transmitter 66 only transmits upstream during time slots allocated to the ONT 31 by the OLT that is in communication with it.

As shown by FIG. 2, the ONT 31 also has memory 75 storing data 77, referred to herein as "ONT data," that can be accessed and used by the ONT controller 31 during operation. As an example, the ONT data 77 may indicate communication characteristics for enabling communication between the ONT 31 and each of the primary OLT 15 and the backup OLT 16. Specifically, the ONT data 77 may indicate the wavelength, transmit power, and other information for controlling the tunable optical transmitter 66 to communicate with the primary OLT 15, as well as the same or similar information for controlling the tunable optical transmitter 66 to communicate with the backup OLT 16. The ONT data 77 may also indicate the wavelength and other information for controlling the tunable optical receiver 67 to receive an optical signal from the primary OLT 15, as well as the same or similar information for controlling the tunable optical receiver 67 to receive an optical signal from the backup OLT 16.

When the ONT controller 69 detects a communication failure with the primary OLT 15, such as a loss of synchronization or no longer receiving an optical signal from the primary OLT 15 for at least a predetermined amount of time, the ONT controller 69 is configured to initiate a failover switch to the backup OLT 16. In this regard, the ONT controller 69 is configured to access the ONT data 77 in order to determine the wavelength pair (i.e., upstream wavelength and downstream wavelength) for the backup OLT 16 and then to control the tunable optical transmitter 66 and the tunable optical receiver 67 based on the ONT data 77. Specifically, as will be described in more detail below, the ONT controller 69 is configured to control the tunable optical transmitter 66 such that it is tuned to the upstream wavelength of the backup OLT 16, and the ONT controller 69 is configured to control the tunable optical receiver 67 such that it is tuned to the downstream wavelength of the backup OLT 16. Accordingly, when a communication failure with the primary OLT 15 is detected, the ONT 31 is re-configured for communication with the backup OLT 16.

Figure 3:
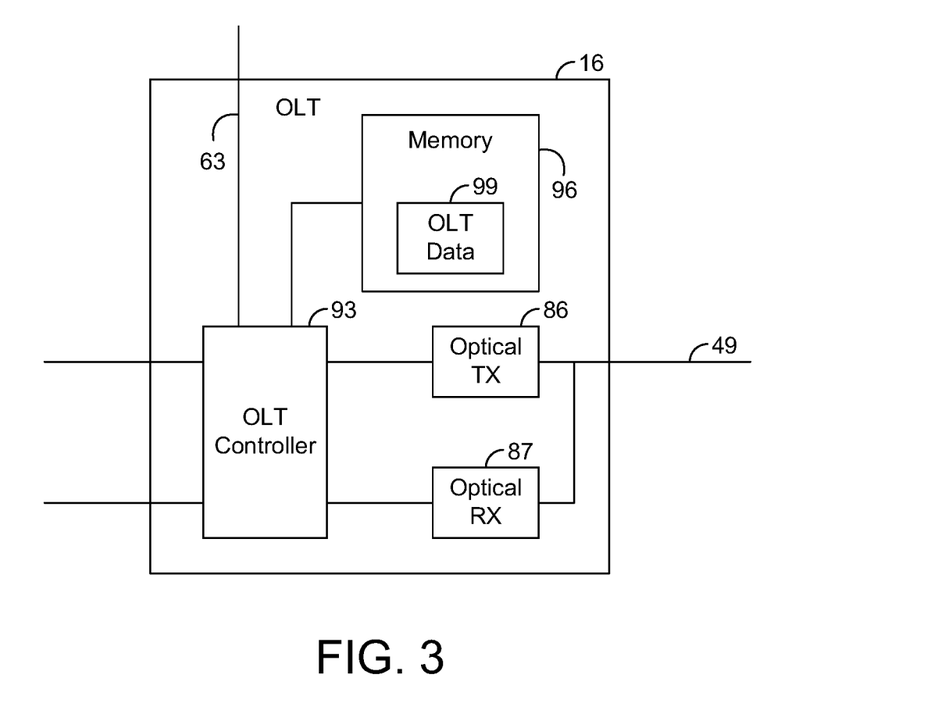
FIG. 3 is a block diagram illustrating an exemplary embodiment of an optical line terminal (OLT), such as is depicted by FIG. 1.

An exemplary embodiment of the backup OLT 16 is shown by FIG. 3. As shown by FIG. 3, the backup OLT 16 has an optical transmitter 86 and an optical receiver 87 that are optically coupled to the fiber 49 and wavelength MUX 45 (FIG. 1). The transmitter 86 has at least one optical component, such as a laser, for transmitting optical signals through the fiber 49 to the ONTs 31-35. The receiver 87 has at least one optical component, such as an avalanche photodiode (APD), for receiving optical signals from the fiber 49. The configuration of the optical transmitter 86 and optical receiver 87 may be the same as or similar to that of the tunable optical transmitter 66 and the tunable optical receiver 87. However, it is possible for other types of optical transmitters and receivers to be used in other embodiments.

As shown by FIG. 3, the OLT 16 has a controller 93, referred to herein as "OLT controller," and memory 96. The OLT controller 93 can be implemented in hardware or a combination of hardware in conjunction with software or firmware. As an example, the controller 93 may include one or more application specific integrated circuits (ASICs), field-programmable gate arrays (FPGAs), processors (e.g., microprocessors) programmed with software or firmware, and/or other types of circuitry for performing the functionality or tasks described herein for the controller 93.

In this regard, the OLT controller 93 is configured to perform and control various operations, as will be described in more detail herein. As an example, in the downstream direction, the OLT controller 69 may be configured to receive a stream of data from network gateway 22 (FIG. 1), encapsulate the stream in accordance with an optical protocol of the TWDM-PON 12, such as NG-PON2, and provide the data stream to the optical transmitter 86 for transmission to the ONTs 31-35. In the downstream direction, the OLT controller 93 may be configured to receive a stream of data from the optical receiver 87, de-encapsulate the data to strip away overhead associated with the optical protocol of the TWDM-PON 12, and transmit the data further upstream.

As shown by FIG. 3, the OLT 16 also has memory 96 storing data 99, referred to herein as "OLT data," that can be accessed and used by the OLT controller 93 during operation. As an example, the OLT data 99 may define a list of network identifiers identifying ONTs that are currently assigned to the OLT 16 for communication. For such ONTs, the OLT controller 93 may be configured to allocate time slots for upstream communication and transmit control data via a control channel embedded in an optical protocol of the TWDM-PON 12 to inform each ONT of which time slots are allocated to it. The OLT data 99 may also define a list of network identifiers identifying ONTs for which the OLT 16 serves as backup for the ONT's primary OLT. For illustrative purposes, assume that the OLT 16 serves as a backup for ONT 31. The configuration of the primary OLT 15 may be the same as or similar to the configuration of the backup OLT 16 shown by FIG. 3.

During normal operation, the ONT 31 communicates with its primary OLT 15. During such time, the tunable optical transmitter 66 and tunable optical receiver 67 of the ONT 31 are tuned to a respective wavelength of the wavelength pair associated with the primary OLT 15, and the ONT 31 does not communicate with the backup OLT 16, which is associated with a different wavelength pair. However, during such normal operation, the OLT controller 93 of the backup OLT 16 is configured to allocate small time slots, referred to herein as "de minimis" timeslots, to the ONT 31 even though the ONT 31 is not communicating with the backup OLT 16. In one embodiment, the size (i.e., duration) of a de minimis time slot is the smallest size that can be allocated by the backup OLT 16 so as to reduce the impact of these time slots to the capacity of the OLT 16 for communication with other ONTs assigned to it. However, larger sizes of the de minimis time slots are possible in other embodiments.

During normal operation while the ONT 31 is communicating with its primary OLT 15, it is expected that the ONT 31 will not communicate with the backup OLT 16 during the de minimis time slots allocated to it. That is, it is expected that the ONT 31 will not fill its de minimis time slots with data. Thus, as long as the backup OLT 16 does not receive data from the ONT 31, the OLT controller 93 of the backup OLT 16 assumes that a failover switch for the ONT 31 has not occurred. In such case, the backup OLT 16 continues to allocate de minimis time slots to the ONT 31 from time-to-time.

As described above, when a communication failure prevents communication between the ONT 31 and its primary OLT 15 for at least a predefined amount of time, the ONT 31 initiates a failover switch by tuning its transmitter 66 and receiver 67 to the wavelength pair associated with the backup OLT 16, thereby enabling communication between the ONT 31 and the backup OLT 16. Once such communication is enabled, the ONT controller 69 of the ONT 31 receives control data from the backup OLT 16 indicating when a de minimis time slot has been allocated to it and then transmits data to the backup OLT 16 during such time slot.

In response to receiving the data from the ONT 31, the backup OLT 16 determines that a failover switch for the ONT 31 has occurred and begins to allocate time slots to the ONT 31 according to its normal algorithm for allocating time slots to ONTs that are currently communicating with it. Thus, the size of the time slots allocated to the ONT 31 on a going-forward basis is increased depending on various factors, including for example, the dynamic load conditions at the ONT 31 and the other ONTs currently communicating with the OLT 16. There are various conventional algorithms for allocating time slots based on dynamic load conditions that may be used by the OLT controller 93 to determine the sizes and/or frequency of the time slots allocated to the ONT 31 and other ONTs communicating with the OLT 16. In addition, other types of algorithms may be used, such as algorithms using fixed grant sizes where the sizes of the allocated time slots are provisioned and remain fixed during normal operation.

In addition to allocating time slots to the ONT 31 in response to a detection of a failover switch, the OLT controller 16 may also send a control signal to the switch 25 (FIG. 1) for causing the switch 25 to send downstream data to the OLT 16. Thus, the downstream data to be sent to the ONT 31 is transmitted to the backup OLT 16 by the switch 25, and the backup OLT 16 transmits such data through the TWDM-PON 12 to the ONT 31.

Therefore, if a failure associated with the primary OLT 15 prevents such OLT 15 from notifying the backup OLT 16 of the failure, the backup OLT 16 is nevertheless capable of performing a failover switch quickly after the failure. Note that the time to effectuate a failover switch after the occurrence of a communication failure depends on the frequency at which de minimis time slots are allocated to the ONT by the backup OLT 16. In this regard, allocating de minimis time slots more frequently (such that the time interval between consecutive de minimis time slots is reduced) has the advantage of enabling a faster failover switch but also the drawback of consuming more upstream capacity. In one embodiment, the frequency of de minimis time slot allocation is controlled to be as low as possible (thereby reducing consumption of upstream capacity) while ensuring that the maximum response time for a failover switch (i.e., the time from disruption of service with the primary OLT 15 to data communication with the backup OLT 16) is below a predefined threshold. In this regard, many SLAs require the response time of a failover switch to be less than 50 ms, and the frequency of the de minimis time slot allocation may be controlled to achieve this requirement. As an example, if it is assumed that the ONT 31 is capable tuning its transmitter 66 and receiver 67 for communication with the backup OLT 16 within 25 ms of a communication failure, then the OLT controller 93 may be configured to control time slot allocation such that a de minimis time slot is allocated to the ONT 31 during normal operation every 5 ms or so to allow for the detection of the failover switch and to effect all such items as are necessary to re-establish traffic flow within the remaining 25 ms interval. The frequency at which the OLT 16 allocates de minimis time slots to the ONT 31 may be a parameter that is provisioned and stored in the memory 96 of OLT 16.

In the example described above, a failover switch between two OLTs 15, 16 is described for simplicity of illustration.

However, any number of OLTs may be used to backup communication with any given ONT. As an example, there may be a plurality of OLTs serving as a backup for an ONT 31. In such example, the ONT 31 may attempt to initiate a failover switch to one of the backup OLTs. If such a failover switch is not successful within a predefined time period, the ONT 31 may attempt to initiate a failover switch with another OLT. The ONT 31 may continue attempting failover switches with different OLTs until a successful failover switch occurs.

In addition, each ONT 31-35 may be similarly configured to initiate a failover switch when communication with its primary OLT is disrupted. Thus, in the example above where ONTs 31-33 are serviced by the primary OLT 15, each of the ONTs 31-33 may initiate a failover switch to the backup OLT 16 according to the techniques described above. Also, it is possible for any OLT to serve as a backup for any number of ONTs, and it is possible for any OLT servicing as a backup to one ONT to serve as the primary OLT for any other ONT.

An exemplary use and operation of the system 10 in performing a failover switch for an ONT 31 will be described in more detail below with reference to FIG. 4. For illustrative purposes, assume that the ONT 31 is assigned to the primary OLT 15 for communication during normal operation and that backup OLT 16 is for use in backing up communication with the ONT 31.

Figure 4:
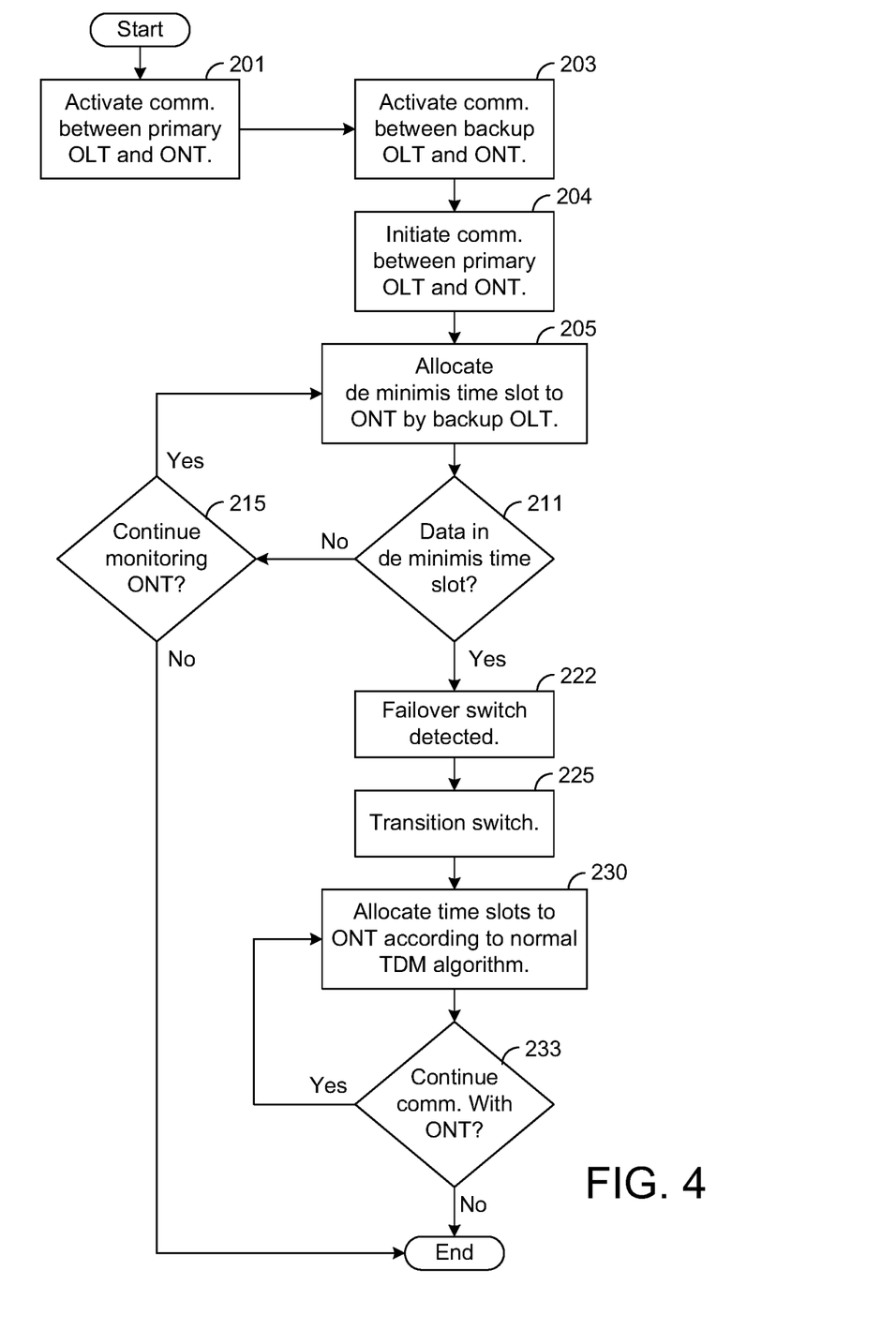
FIG. 4 is a flow chart illustrating an exemplary method for performing a failover switch for an ONT, such as is depicted by FIG. 1.

Initially, communication with the ONT 31 is activated, as shown by blocks 201 and 203 of FIG. 4. As an example, in block 201, the ONT 31 may register or otherwise communicate with the primary OLT 15 in order to enable communication between the primary OLT 15 and the ONT 31 according to the optical protocol used by the primary OLT 15. As part of this process, the primary OLT 15 may assign a network identifier to the ONT 31 and range with the ONT 31. In other embodiments, other techniques for enabling communication with the primary OLT 15 are possible.

The primary OLT 15 may communicate with the backup OLT 16 via connection 63 (FIG. 1) or otherwise to inform the backup OLT 16 of the presence of the ONT 31 and the backup OLT's role in protecting communication with the ONT 31. The primary OLT 15 then commands the ONT 31 to tune to the backup OLT 16 wavelength pairs, where the ONT 31 registers with backup OLT 16 during a normal registration window in block 203 of FIG. 4. Backup OLT 16 then commands the ONT 31 to tune to the primary OLT 15 wavelength pairs, and normal operation beings. In other embodiments, other techniques for establishing the communication characteristics of the ONT 31 and enabling communication with the backup OLT 16 are possible. The ONT controller 69 is provisioned during this process to store in the ONT data 77 information indicative of the appropriate wavelength pairs for tuning the transmitter 66 and receiver 67 during a failover switch, as will be described in more detail below.

Once communication has been activated in blocks 201, 203, the primary OLT 15 and the ONT 31 begin communicating as shown by block 204 of FIG. 4. That is, the primary OLT 15 begins allocating time slots to the ONT according to the primary OLT's normal algorithm for allocating time slots taking into account current load conditions at the ONT 31 and the other ONTs currently communicating with the primary OLT 15.

At this point, the tunable optical transmitter 66 and the tunable optical receiver 67 of the ONT 31 are tuned to the wavelength pair of the primary OLT 15, not the wavelength pair of the backup OLT 16. However, the backup OLT 16 nevertheless allocates de minimis time slots to the ONT 31, as shown by block 205 of FIG. 4. As an example, for each frame, the ONT controller 93 of the backup OLT 16 may transmit downstream control data embedded in the overhead of the optical protocol used by the OLT 16, and such control data may define a bandwidth allocation map indicating how the upstream time slots are allocated for communication with the backup OLT 16. The bandwidth allocation maps transmitted by the backup OLT 16 may indicate that the ONT 31 is periodically allocated de minimis time slots that can be used by the ONT 31 for upstream communication with the backup OLT 16. Until communication with the primary OLT 15 is disrupted, the ONT 31 does not receive and process the bandwidth allocation maps or use the de minimis time slots for upstream communication with the backup OLT 16. In other embodiments, other techniques for informing the ONTs of the time slots allocated to them are possible.

For each de minimis time slot allocated to the ONT 31, the OLT controller 93 of the backup OLT 16 determines whether the ONT 31 transmitted any data in the de minimis time slot, as shown by block 211 of FIG. 4. If not, the OLT controller 93 determines that a failover switch has yet to be detected and determines in block 215 whether to continue monitoring the ONT 31. If monitoring of the ONT 31 is to continue, the OLT controller 93 returns to block 205 and allocates another de minimis time slot to the ONT 31 at the appropriate time.

When communication between the ONT 31 and primary OLT 15 fails (e.g., when the ONT 31 is unable to successfully communicate with the OLT 15 for at least a predefined amount of time), the ONT 31 initiates a failover switch. In this regard, the ONT controller 69 accesses the ONT data 77 to determine the wavelength pair of the backup OLT 16. The ONT controller 69 then tunes the tunable optical transmitter 66 to the upstream wavelength associated with the backup OLT 16 and tunes the tunable optical receiver 67 to the downstream wavelength associated with the backup OLT 16.

Once communication with the backup OLT is established, the ONT controller 69 identifies the next de minimis time slot allocated to the ONT 31 based on the control data transmitted downstream by the backup OLT 16. During such time slot, the ONT 31 transmits data upstream to the backup OLT 16. In response to data in the de minimis time slot, the OLT controller 93 of the backup OLT 16 detects the occurrence of a failover switch, as shown by block 222 of FIG. 4. Thus, the OLT controller 93 transmits a control signal to the switch 25 for transitioning the switch 25 to a state for transmitting, to the backup OLT 16, the data stream received by the switch 25 from the network gateway 22, as shown by block 225 of FIG. 4. Such data stream includes data to be transmitted to the ONT 31, and the backup OLT 16 encapsulates such data according to the optical protocol of the OLT 16 and transmits the data downstream through the TWDM-PON 12 along with data received from the switch 26, including data for ONTs in communication with the backup OLT 16 prior to the failover switch.

As shown by block 230, the OLT controller 93 also begins allocating upstream time slots to the ONT 31 according to the backup OLT's normal TDM algorithm for allocating time slots for ONTs in communication with it. Such algorithm may take into account the dynamic load conditions at the ONTs in communication with the backup OLT 16 in defining the time slot size and/or frequency of timeslot allocation. Other types of algorithms are possible in other embodiments. In block 233, the OLT controller 93 determines whether communication with the ONT 31 is to continue. If so, the OLT controller 93 continues to allocate time slots to the ONT 31 in block 230.

Thus, when a communication failure occurs between the primary OLT 15 and the ONT 31, a failover switch is quickly detected and performed by the system 10 thereby reducing the time that the ONT 31 is unable to communicate across the TWDM-PON 12. Indeed, using the techniques described herein for performing a failover switch, the amount of time that service with the ONT 31 is lost or delayed due to a communication failure with an OLT can be kept relatively low, even less than 50 ms, thereby helping service providers maintain SLA guarantees.

Now, therefore, the following is claimed:

1. An optical network, comprising:
   an optical fiber;
   a first optical line terminal (OLT) coupled to the optical fiber;
   a first optical network terminal (ONT) having a tunable optical transmitter coupled to the optical fiber and a tunable optical receiver coupled to the optical fiber, the first ONT configured to tune the tunable optical transmitter and the tunable optical receiver to a first wavelength pair of the first OLT for communication with the first OLT through the optical fiber;
   a second OLT coupled to the optical fiber and configured to communicate with the first ONT through the optical fiber on a second wavelength pair, the second OLT configured to allocate a first plurality of time slots to the first ONT, at least a first time slot of the first plurality of time slots allocated to the first ONT by the second OLT prior to a communication failure between the first ONT and the first OLT while the tunable optical transmitter and the tunable optical receiver are tuned to the first wavelength pair for communication with the first OLT,
   wherein the second OLT is configured to allocate the first plurality of time slots to the first ONT by transmitting control data through the optical fiber at a wavelength of the second wavelength pair,
   wherein a first portion of the control data indicates that at least the first time slot of the first plurality of time slots is allocated to the first ONT,
   wherein a second portion of the control data indicates that at least a second time slot of the first plurality of time slots is allocated to the first ONT,
   wherein the tunable optical transmitter and the tunable optical receiver are tuned to the first wavelength pair during transmission of the first portion of the control data by the second OLT such that the first ONT does not respond to the first portion of the control data,
   wherein the first ONT is configured to detect the communication failure between the first ONT and the first OLT and to tune the tunable optical transmitter and the tunable optical receiver to the second wavelength pair in response to detection of the communication failure,
   wherein the second portion of the control data is received by the first ONT after detection of the communication failure,
   wherein the first ONT is configured to transmit data to the second OLT in at least the second time slot based on the second portion of the control data, and
   wherein the second OLT is configured to detect a failover switch associated with the first ONT based on a presence of the data in the second time slot of the first plurality of time slots and to allocate a second plurality of time slots to the first ONT according to a time division multiplexing (TDM) algorithm in response to detection of the failover switch.

2. The optical network of claim 1, wherein according to the TDM algorithm the second OLT is configured to determine sizes of the second plurality of time slots based on dynamic load conditions at the first ONT and a plurality of ONTs in communication with the second OLT.

3. The optical network of claim 1, wherein the first OLT is configured to range with the first ONT and to command the first ONT to range with the second OLT.

4. The optical network of claim 1, further comprising a plurality of ONTs coupled to the optical fiber and configured to communicate with the second OLT through the optical fiber on the second wavelength pair, wherein the second OLT is configured to transmit the control data through the optical fiber at the wavelength of the second wavelength pair to the plurality of ONTs.

5. A system for use in an optical network, comprising:
   a first optical line terminal (OLT) for communicating with an optical network terminal (ONT) through an optical fiber via a first wavelength pair, the ONT having a tunable optical transmitter and a tunable optical receiver tuned to the first wavelength pair; and
   a second OLT for communicating with the ONT through the optical fiber via a second wavelength pair, the second OLT configured to allocate a first plurality of time slots to the ONT by transmitting control data indicating that the first plurality of time slots are allocated to the ONT, at least a first time slot of the first plurality of time slots allocated to the ONT by the second OLT while the tunable optical transmitter and the tunable optical receiver are tuned to the first wavelength pair for communication with the first OLT,
   wherein the tunable optical transmitter and the tunable optical receiver are tuned to the first wavelength pair during transmission of a portion of the control data indicating that the first time slot of the first plurality of time slots is allocated to the ONT such that the ONT does not respond to the control data for transmitting to the second OLT via the second wavelength pair during the first time slot of the first plurality of time slots,
   wherein the second OLT is configured to detect a failover switch associated with the ONT based on a presence of data in at least a second time slot of the first plurality of time slots and to allocate a second plurality of time slots to the ONT according to a time-division multiplexing (TDM) algorithm in response to detection of the failover switch.

6. The system of claim 5, wherein according to the TDM algorithm the second OLT is configured to determine sizes of the second plurality of time slots based on dynamic load conditions at the ONT and a plurality of ONTs in communication with the second OLT.

7. The system of claim 5, wherein the first OLT is configured to range with the ONT and to command the ONT to range with the second OLT.

8. The system of claim 5, wherein the second OLT is further configured to allocate by transmitting, through the optical fiber, control data indicating that the first plurality of time slots are allocated to the ONT by the second OLT on the second wavelength pair, and wherein the ONT is configured for communication with the first OLT via the first wavelength pair when a portion of the control data is transmitted through the optical fiber on the second wavelength pair.

9. A method for use in an optical network, comprising:
ranging between a first optical line terminal (OLT) and a first optical network terminal (ONT) through an optical fiber;
ranging between a second OLT and the first ONT through the optical fiber;
communicating between the first OLT and the first ONT via a first wavelength pair through the optical fiber subsequent to each of the ranging;
allocating a first plurality of time slots to the first ONT by the second OLT, at least a first time slot of the first plurality of time slots allocated to the first ONT while a tunable optical transmitter and a tunable optical receiver of the first ONT are tuned to the first wavelength pair, the allocating comprising transmitting control data from the second OLT through the optical fiber via a second wavelength pair, the control data indicating that the first plurality of times slots are allocated to the first ONT, wherein the tunable optical transmitter and the tunable optical receiver are tuned to the first wavelength pair during transmission of a portion of the control data such that the first ONT does not respond to the portion of the control data for transmitting via the second wavelength pair to the second OLT during the first time slot of the first plurality of time slots, and wherein the portion of the control data indicates that the first time slot of the first plurality of time slots is allocated to the first ONT;
detecting, at the first ONT, a communication failure between the first OLT and the first ONT;
initiating a failover switch at the first ONT in response to the detecting, the failover switch for switching communication with the first ONT from the first OLT to the second OLT, wherein the initiating comprises:
(1) tuning the tunable optical transmitter of the first ONT to an upstream wavelength of the second wavelength pair;
(2) tuning a tunable optical receiver of the first ONT to a downstream wavelength of the second wavelength pair; and
(3) transmitting data to the second OLT in at least one of the first plurality of time slots,
receiving the data at the second OLT; and
allocating a second plurality of time slots to the first ONT by the second OLT according to a time-division multiplexing algorithm in response to the receiving.

10. The method of claim 9, wherein the allocating the second plurality of time slots comprises determining sizes of the second plurality of time slots based on dynamic load conditions at the first ONT and a plurality of ONTs in communication with the second OLT.

11. The method of claim 9, further comprising instructing the first ONT by the first OLT to range with the second OLT.

12. A method for use in an optical network, comprising:
ranging between a first optical line terminal (OLT) and a first optical network terminal (ONT) through an optical fiber;
ranging between a second OLT and the first ONT through the optical fiber;
communicating between the first OLT and the first ONT via a first wavelength pair through the optical fiber subsequent to each of the ranging;
allocating a first plurality of time slots to the first ONT by the second OLT, at least one of the first plurality of time slots allocated to the first ONT during the communicating between the first OLT and the first ONT, the allocating comprising transmitting control data from the second OLT to the first ONT via a second wavelength pair, the control data indicating that the first plurality of time slots are allocated to the first ONT, wherein a portion of the control data is transmitted to the first ONT while the first ONT is tuned for communication with the first OLT via the first wavelength pair such that the portion of the control data is not received by the first ONT, and wherein the portion of the control data indicates that at least a first time slot of the first plurality of time slots is allocated to the first ONT;
detecting a communication failure between the first ONT and the first OLT by the first ONT;
transmitting data in at least a second time slot of the first plurality of time slots from the first ONT to the second OLT through the optical fiber via the second wavelength pair;
detecting, at the second OLT, a failover switch associated with the first ONT based on a presence of the data in the second time slot of the first plurality of time slots; and
allocating a second plurality of time slots to the first ONT by the second OLT based on the detecting the failover switch.

13. The method of claim 12, wherein the allocating the second plurality of time slots comprises determining sizes of the second plurality of time slots based on dynamic load conditions at the first ONT and a plurality of ONTs in communication with the second OLT.

14. The method of claim 12, further comprising instructing the first ONT by the first OLT to range with the second OLT.

15. The method of claim 12, wherein the allocating comprises transmitting control data from the second OLT through the optical fiber, the control data indicating that at least one of the first plurality of time slots are allocated to the first ONT, wherein the transmitting the control data is performed while the first ONT is configured for communication with the first OLT.

16. An optical network, comprising:
an optical fiber;
a first optical line terminal (OLT) coupled to the optical fiber;
an optical network terminal (ONT) having a tunable optical transmitter coupled to the optical fiber and a tunable optical receiver coupled to the optical fiber, the ONT configured to tune the tunable optical transmitter and the tunable optical receiver to a first wavelength pair of the first OLT for communication with the first OLT through the optical fiber; and
a second OLT coupled to the optical fiber and configured to communicate with the ONT through the optical fiber on a second wavelength pair, the second OLT configured to allocate a first plurality of time slots to the ONT, at least a first time slot of the first plurality of time slots allocated to the ONT by the second OLT prior to a communication failure between the ONT and the first OLT while the tunable optical transmitter and the tunable optical receiver are tuned to the first wavelength pair for communication with the first OLT,
wherein the tunable optical transmitter and the tunable optical receiver are tuned to the first wavelength pair during transmission via the second wavelength pair of control data indicating the first time slot of the first plurality of time slots such that the ONT does not respond to the control data for transmitting to the second OLT via the second wavelength pair during the first time slot of the first plurality of time slots, wherein the ONT is configured to detect the communication failure between the ONT and the first OLT and to tune the tunable optical transmitter and the tunable optical receiver to the second wavelength pair in response to detection of the communication failure, wherein the ONT is configured to transmit data to the second OLT in at least a second time slot of the first plurality of time slots, and wherein the second OLT is configured to detect a failover switch associated with the ONT based on a presence of the data in the second time slot of the first plurality of time slots and to allocate a second plurality of time slots to the ONT according to a time division multiplexing (TDM) algorithm in response to detection of the failover switch.

17. A system for use in an optical network, comprising:

an optical network terminal (ONT) coupled to an optical fiber, the ONT having a tunable optical transmitter and a tunable optical receiver tuned to a first wavelength pair;

a first optical line terminal (OLT) coupled to the optical fiber and configured to communicate with the ONT through the optical fiber via the first wavelength pair; and a second OLT coupled to the optical fiber and configured to communicate with the ONT through the optical fiber via a second wavelength pair, the second OLT configured to allocate a first plurality of time slots to the ONT by transmitting to the ONT first control data while the tunable optical transmitter and the tunable optical receiver are tuned to the first wavelength pair such that the ONT does not respond to the first control data, wherein the first control data indicates that the first plurality of time slots are allocated to the ONT, wherein the ONT is configured to detect a communication failure between the ONT and the first OLT and to tune the tunable optical transmitter and the tunable optical receiver to the second wavelength pair in response to detection of the communication failure, wherein the second OLT is configured to allocate a second plurality of time slots to the ONT by transmitting to the ONT second control data indicating that the second plurality of time slots are allocated to the ONT, wherein the second control data is transmitted by the second OLT after the communication failure, and wherein the second OLT is configured to detect a failover switch associated with the ONT based on a presence of data in the second plurality of time slots and to allocate a third plurality of time slots to the ONT according to a time-division multiplexing (TDM) algorithm based on detection of the failover switch.

* * * * *